US012670454B2

(12) United States Patent
Napoli et al.

(10) Patent No.: US 12,670,454 B2
(45) Date of Patent: Jun. 30, 2026

(54) TECHNIQUES FOR GENERATING WORKFLOWS USING AN LLM-BASED SYSTEM

(71) Applicant: CUMULUS DIGITAL SYSTEMS, INC., Cambridge, MA (US)

(72) Inventors: Joshua Napoli, Providence, RI (US); Dylan Sumiskum, Boston, MA (US)

(73) Assignee: CUMULUS DIGITAL SYSTEMS, INC., Cambridge, MA (US)

( * ) Notice: Subject to any disclaimer, the term of this patent is extended or adjusted under 35 U.S.C. 154(b) by 113 days.

(21) Appl. No.: 18/428,261

(22) Filed: Jan. 31, 2024

(65) Prior Publication Data

US 2025/0156783 A1     May 15, 2025

Related U.S. Application Data

(60) Provisional application No. 63/597,684, filed on Nov. 9, 2023.

(51) Int. Cl.
*G06Q 10/0633* (2023.01)
*G06Q 10/0631* (2023.01)
*G06Q 50/04* (2012.01)

(52) U.S. Cl.
CPC ... *G06Q 10/0633* (2013.01); *G06Q 10/06316* (2013.01); *G06Q 50/04* (2013.01)

(58) Field of Classification Search
None
See application file for complete search history.

(56) References Cited

U.S. PATENT DOCUMENTS

| | | | | |
|---|---|---|---|---|
| 2014/0282257 A1* | 9/2014 | Nixon | ..................... | G05B 11/01 |
| | | | | 715/835 |
| 2016/0307125 A1 | 10/2016 | Visnovec et al. | | |
| 2019/0034855 A1 | 1/2019 | Halioris et al. | | |
| 2019/0176306 A1 | 6/2019 | Sorensen et al. | | |
| 2020/0026757 A1* | 1/2020 | Bagley, Jr. | ......... | G05B 19/0423 |
| 2023/0214583 A1* | 7/2023 | Sawyer | ............ | G06V 30/19173 |
| 2024/0069517 A1 | 2/2024 | Chikwendu et al. | | |
| 2024/0289545 A1* | 8/2024 | Miller | ..................... | G06F 40/20 |

FOREIGN PATENT DOCUMENTS

CN     116775183 A     9/2023

OTHER PUBLICATIONS

Xia, et al. "Towards autonomous system: flexible modular production system enhanced with large language model agents," Sep. 2023, IEEE 28th International Conference on Emerging Technologies and Factory Automation, pp. 1-8 (Year: 2023).*

(Continued)

*Primary Examiner* — Ivan R Goldberg
(74) *Attorney, Agent, or Firm* — Lando & Anastasi, LLP

(57) ABSTRACT

Techniques are provided for workflow generation, including: (a) receiving, from a user, an instruction to create a workflow to perform a task; (b) generating one or more prompts based on the instruction and a predefined workflow schema; (c) querying a large language model (LLM) with the one or more prompts; (d) in response to querying the LLM, receiving a workflow in a format consistent with the predefined workflow schema from the LLM; and (e) displaying a visualization of the received workflow to the user.

15 Claims, 2 Drawing Sheets

(56)                    References Cited

OTHER PUBLICATIONS

Brockman et al., "The Schema-Based Approach to Workflow Management," IEEE Transactions on Computer-aided Design of Integrated Circuits and Systems, IEEE, USA, vol. 14, No. 10, Oct. 1995, pp. 1257-1265.

International Search Report and Written Opinion from corresponding International Application No. PCT/US2024/053983 dated Jan. 31, 2025.

Makatura et al., "How Can Large Language Models Help Humans in Design and Manufacturing?", arxiv.org, Cornell University Library, 201 Olin Library Cornell University Ithaca, NY 14853, Jul. 25, 2023, pp. 1-5 and 22-48.

Sanger et al., "Large Language Models to the Rescue: Reducing the Complexity in Scientific Workflow Development Using ChatGPT," arxiv.org, Cornell University Library, 201 Olin Library Cornell University Ithaca, NY 14853, Nov. 3, 2023, pp. 4-13.

* cited by examiner

Fig. 1

TECHNIQUES FOR GENERATING WORKFLOWS USING AN LLM-BASED SYSTEM

CROSS REFERENCE TO RELATED APPLICATION

This application claims priority under 35 USC § 119(e) to U.S. Provisional Patent Application Ser. No. 63/597,684, titled "TECHNIQUES FOR GENERATING WORK-FLOWS USING AN LLM-BASED SYSTEM," filed Nov. 9, 2023, which is hereby incorporated herein in its entirety by this reference.

BACKGROUND

Performance of complex tasks made up of multiple steps are fraught with many potential pitfalls. For example, a user may forget an important step or perform a step out of order. In some contexts, the error may be costly. In order to avoid these problems, workflows may be used so that a user may follow a series of detailed instructions in order.

SUMMARY

Although workflows are very useful, it can be difficult to generate them. Users may not know all of the proper steps to include in the workflow in the proper order. Even if the user knows the proper steps and order, the user may not be skilled enough to use a framework appropriate for the tasks and to list workpieces for the workflow with an appropriate level of detail.

Thus, it would be desirable for a system to allow a user to request creation of a detailed workflow using a natural language instruction and to automatically create such a workflow. This may be accomplished by utilizing a large language model (LLM) artificial intelligence engine and feeding it a request together with detailed schema to generate an appropriate workflow. In some embodiments, a user may provide a document detailing how to perform the task instead of relying on the LLM to generate the details based on its previously-ingested knowledge.

In one embodiment, a method of workflow generation is performed by a computing system. The method includes: (a) receiving, from a user, an instruction to create a workflow to perform a task; (b) generating one or more prompts based on the instruction and a predefined workflow schema; (c) querying a large language model (LLM) with the one or more prompts; (d) in response to querying the LLM, receiving a workflow in a format consistent with the predefined workflow schema from the LLM; and (e) displaying a visualization of the received workflow to the user. A system, apparatus, and computer program product for performing this method and similar methods are also described.

BRIEF DESCRIPTION OF THE DRAWINGS

Objects, features, and advantages will be apparent from the following description of particular embodiments, as illustrated in the accompanying drawings in which like reference characters refer to the same parts throughout the different views. The drawings are not necessarily to scale, emphasis instead being placed upon illustrating the principles of various embodiments.

FIG. 1 illustrates an example system, apparatus, computer program product, and associated data structures for use in connection with one or more embodiments.

DETAILED DESCRIPTION

Figure 1:
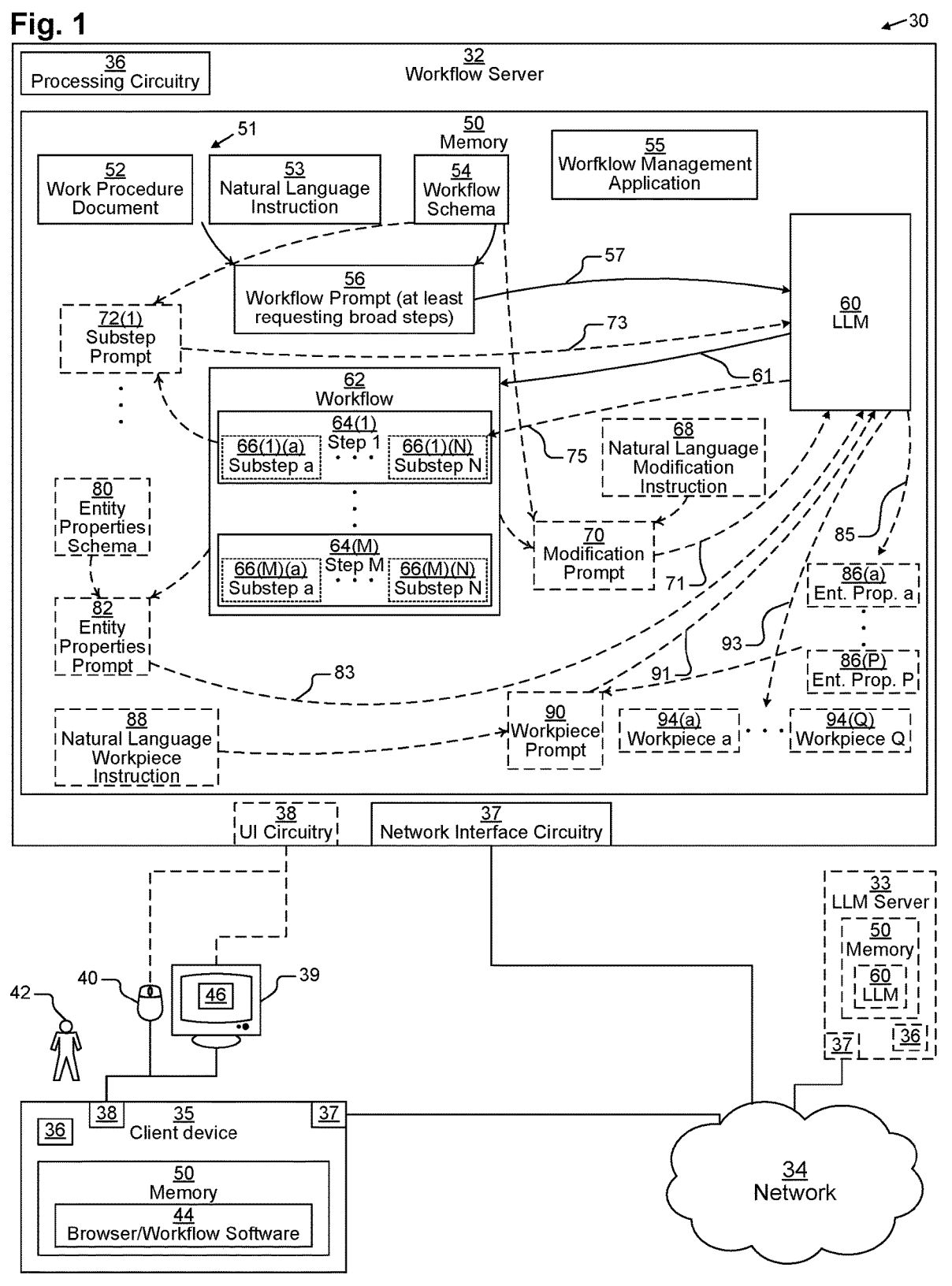
Figure 2:
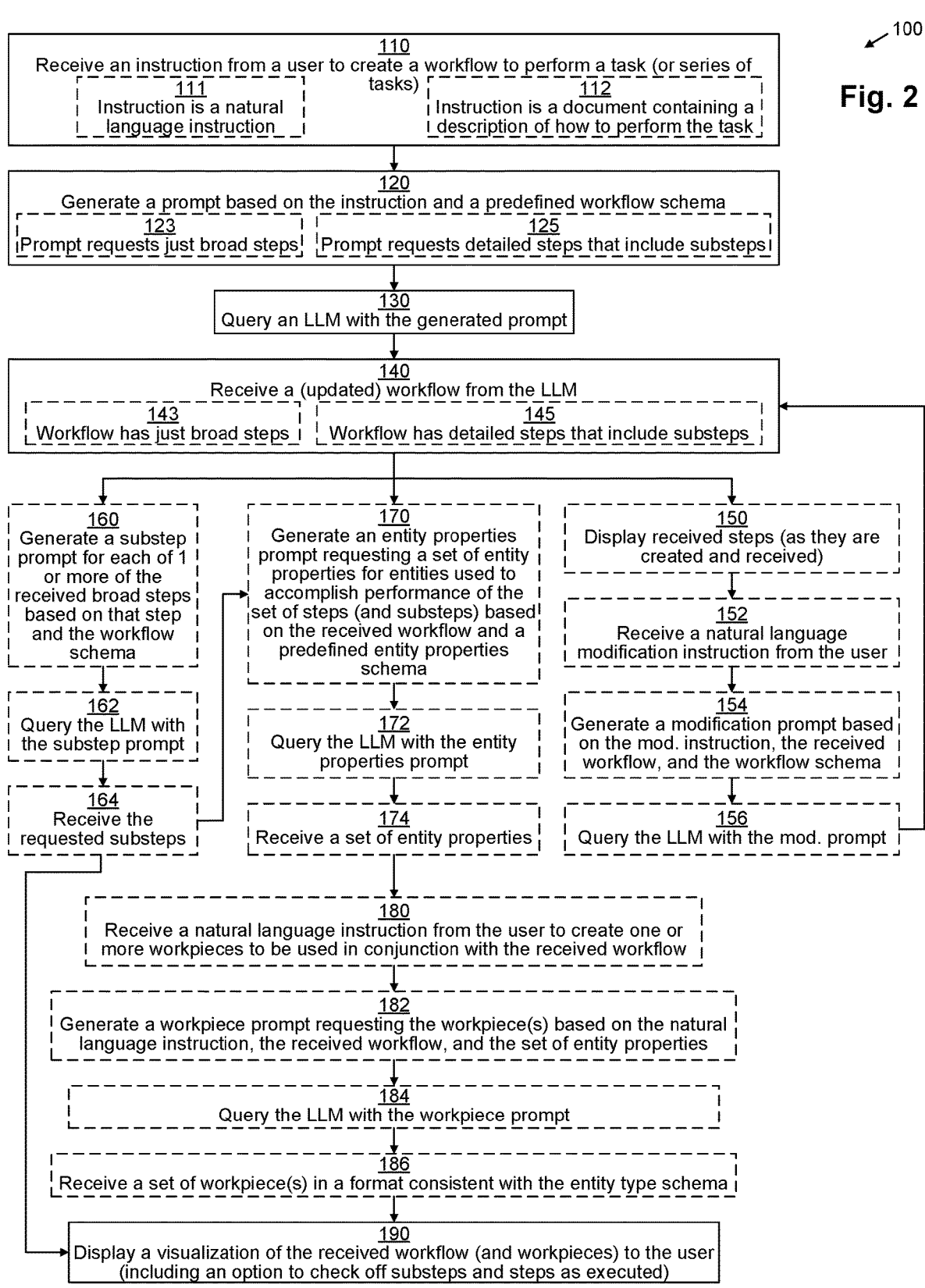
FIG. 2 illustrates an example method in accordance with one or more embodiments.

FIG. 1 depicts an example system 30 for use in connection with various embodiments. System 30 includes a workflow server 32 connected to a user interface (UI) display device 39, one or more UI input device(s) 40, and a user 42. In some embodiments, system 30 may also include a large language model (LLM) server 33, a network 34, and/or a client device 35.

Workflow server 32, client device 35, and LLM server 33 may each be any kind of computing device, such as, for example, a personal computer, laptop, workstation, server, enterprise server, tablet, smartphone, etc. Workflow server 32, client device 35, and LLM server 33 each include processing circuitry 36 and memory 50. Workflow server 32, client device 35, and LLM server 33 may each also include network interface circuitry 37 for connecting to network 34, UI circuitry 38, and/or various additional features as is well-known in the art, such as, for example, interconnection buses, etc.

Processing circuitry 36 may include any kind of processor or set of processors configured to perform operations, such as, for example, a microprocessor, a multi-core micropro-cessor, a digital signal processor, a system on a chip (SoC), a collection of electronic circuits, a similar kind of control-ler, or any combination of the above.

Network interface circuitry 37 may include one or more Ethernet cards, cellular modems, Fibre Channel (FC) adapt-ers, InfiniBand adapters, wireless networking adapters (e.g., Wi-Fi), and/or other devices for connecting to network 34. Network 34 may be any kind of communications network or set of communications networks, such as, for example, a LAN, WAN, SAN, the Internet, a wireless communication network, a virtual network, a fabric of interconnected switches, etc.

UI circuitry 38 may include, for example, a keyboard controller, a mouse controller, a touch controller, a serial bus port and controller, a universal serial bus (USB) port and controller, a wireless controller and antenna (e.g., Blu-etooth), a graphics adapter and port, etc.

A display device 39 may be any kind of display, including, for example, a CRT screen, LCD screen, LED screen, etc. Input device(s) 40 may include a keyboard, keypad, mouse, trackpad, trackball, pointing stick, joystick, touchscreen (e.g., embedded within display device 39), microphone/voice controller, etc. In some embodiments, instead of being external to workflow server 32 or client device 35, the input device 38 and/or display device 39 may be embedded within the workflow server 32 or client device 35 (e.g., a cell phone or tablet with an embedded touchscreen). Display device 39 displays a UI 46 to the user 42, and user 42 can enter information into the UI 46 using the one or more input devices 40.

As depicted in FIG. 1, the one or more input devices 40 and display device 39 used by the user 42 may either be connected to the UI circuitry 38 of the workflow server 32 or the client device 35, allowing the user 42 to either interact directly with the workflow server 32 or to instead interact with client device 35, which runs either a general-purpose browser or specialized workflow software 44 to communi-cate with workflow server 32.

Memory 50 may include any kind of digital system memory, such as, for example, random access memory (RAM). Memory 50 stores an operating system (OS, not depicted, e.g., a Linux, UNIX, Windows, MacOS, or similar operating system and various drivers and other applications and software modules configured to execute on processing circuitry 36 as well as various data.

Memory 50 of workflow server 32 stores a workflow management application 55 and an LLM 60 in operation on processing circuitry 36, and various data 51, 54, 56, 62, 68, 70, 72, 80, 82, 86, 88, 90, and/or 94. In some embodiments, instead of LLM 60 being located on workflow server 32, LLM 60 may be located on LLM server 33 across network 34.

Memory 50 of workflow server 32 stores a user instruction 51, which may either take the form of a work procedure document 52 uploaded by user 42 or a natural language instruction 53 entered by user 42. Work procedure document 52 includes step-by-step instructions for how to perform a task (or series of tasks) that define a workflow 62. Alternatively, natural language instruction 53 instructs workflow management application 55 to create workflow 62. As an example, natural language instruction 53 may be something like "Create a workflow to build a bathroom" or "Generate a workflow to build a personal computer."

Memory 50 of workflow server 32 also stores a workflow schema 54. Workflow schema 54 defines a structure to be used by workflow 62, being made up of a series of steps 64 (depicted as steps 64(1) . . . 64(M)), each step 64 having a series of substeps 66 (depicted as substeps 66(1)(a) . . . 66(1)(N) for step 64(1) and substeps 66(M)(a) . . . 66(M)(N) for step 64(M)). Steps 64 may alternatively be referred to as "operations" or "acts," in which case substeps 66 may alternatively be referred to as "steps." In an embodiment, workflow schema 54 may define the structure of a workflow 64 in accordance with workflows described in U.S. patent application Ser. No. 17/896,857 (published as U.S. Patent Application Publication No. 2024/0069517 A1 on Feb. 29, 2024), entitled "SYSTEM AND METHOD FOR GUIDING OPERATIONS ON A WORKPIECE," filed on Aug. 26, 2022, the entire contents and teachings of which are hereby incorporated herein by this reference. In some embodiments, workflow schema 54 may be provided in GraphQL format using JSON objects, an example of which is provided in Appendix A, the entire contents and teachings of which are hereby incorporated herein by this reference (also see Table 1, below, showing a GraphQL schema that a software developer can use to generate a WorkflowsModel in json that conforms to the schema.).

TABLE 1

GraphQL schema that a software developer can use to generate a WorkflowsModel in json that conforms to the schema

```
Schema:
\'\'\'
enum QuestionType {
    YesNo
    Numeric
}
type Question {
    question: String!
    type: QuestionType
}
type ChecklistStepModel {
    id: String!
    operationId: String!
    title: String
    questions: [Question!]
    actionButtonLabel: String
}
type RecordTagStepModel {
    id: String!
    operationId: String!
    instruction: String
    actionButtonLabel: String
}
type InstructionStepModel {
    id: String!
    operationId: String!
    title: String
    instructions: [String!]
    actionButtonLabel: String
}
type PressureTestStepModel {
    id: String!
    operationId: String!
    type: String
    actionButtonLabel: String
}
type ReviewPhotoStepModel {
    id: String!
    operationId: String!
    requiredNumberOfPhotos: Int
    skippable: Boolean
    actionButtonLabel: String
    textInstruction: String
}
type TakePhotoStepModel {
    id: String!
    operationId: String!
```

TABLE 1-continued

GraphQL schema that a software developer can use to generate a WorkflowsModel in
json that conforms to the schema

```
  textInstruction: String
  photoResolution: Int
  skippable: Boolean
  isReportable: Boolean
  actionButtonLabel: String
}
enum TightenPattern {
  Star
  Clockwise
}
type BoltTorquingStepModel {
  id: String!
  operationId: String!
  passName: String
  target: Float
  warningThreshold: Float
  exception Threshold: Float
  pattern: TightenPattern
  actionButtonLabel: String
}
union Step = TakePhotoStepModel | ReviewPhotoStepModel | ChecklistStepModel |
RecordTagStepModel | BoltTorquingStepModel | InstructionStepModel |
Pressure TestStepModel
type OperationConfigurationModel {
  id: String!
  displayName: String!
  previousOperationId: String
  resultingStatus: String!
  failureStatus: String!
  steps: [Step]
}
type WorkflowsModel {
  id: String!
  entityTypeId: String!
  entityTypeName: String!
  operations: [OperationConfigurationModel]
}
\'\'\'
Keywords:
Workflow: Maps to WorkflowsModel.
Procedure: Similar to workflow.
Operation: Maps to OperationConfigurationModel.
Work: Similar to operation.
Step: Maps to Step.
Action: Similar to step.
Constraints:
You cannot modify or add to the schema.
Wrap JSON objects in \'\'\' tags.
Return only the JSON objects and nothing else.
Say "I'm sorry I can't do that" when receiving an irrelevant question or request.
Instructions:
You will first return the workflow object with the operations. You will then be asked to
populate the steps of each operations.
Please create the workflow object with multiple operations. Always add multiple steps to each
operation.
When creating questions, try to group similar ones together. Limit the number of questions to 8.
While creating instructions, be very specific and it should include the "things we need"
instruction in the first operation to prepare for the given workflow.
One or many TakePhotoStepModel should be accompanied with at least one
ReviewPhotoStepModel.
Do not use BoltTorquingStepModel unless the workflow specifies torquing bolts.
Add PressureTestStepModel if the workflow requires a hydrostatic pressure testing step.
A RecordTagStepModel should only be used for scanning QR tags attached to the entity.
Photo resolutions can either be 720, 1080, or 1440.
Every model should have a \'__typename\' property.
Operation ids should be unique. Step ids should be unique.
Resulting statuses should be unique for every operation. Statuses should use pascal casing.
Entity type id is the thing that the workflow applies to.
```

Workflow management application 55 uses the user instruction 51 and the workflow schema 54 to generate a workflow prompt 56, which it sends (step 57) to LLM 60, requesting that LLM 60 output (step 61) workflow 62. Workflow prompt 56 requests that workflow 62 at least broadly include steps 64. In some embodiments, workflow prompt 56 may also request that each step 64 include substeps 66. In other embodiments, workflow management application 55 may generate and send to LLM 60 (step 73) a substep prompt 72 for one or more of the steps 64 of the workflow 62 returned by the LLM 60, the substep prompt 72 being based on the workflow schema 54 and a respective step 64. Each substep prompt 72 requests that LLM 60 fill in (step 75) the substeps 66 for its respective step 64.

In some embodiments, memory 50 of workflow server 32 may also store a natural language modification instruction 68 from user 42 directing that one or more steps 64 or substeps 66 of workflow 62 be modified. Workflow management application 55 uses the natural language modification instruction 68, the previously-created workflow 62, and the workflow schema 54 to generate a modification prompt 70, which it sends (step 71) to LLM 60, requesting that LLM 60 re-output (step 61) workflow 62, modified as requested.

Memory 50 of workflow server 32 may also store an entity properties schema 80. Entity properties schema 80 defines a basic structure to be used for entity types that define workpieces to be used in conjunction with the workflow 62. In an embodiment, entity properties schema 80 may define the structure of entity types in accordance with U.S. Patent Application Publication No. 2024/0069517 A1. In some embodiments, entity properties schema 80 may be provided in GraphQL format using JSON objects, an example of which is provided in Appendix A. In some embodiments, workflow management application 55 may generate and send to LLM 60 (step 83) an entity properties prompt 82, the entity properties prompt 82 being based on the workflow 62 and the entity properties schema 80. The entity properties prompt 82 requests that LLM 60 generate (step 85) a set of entity properties 86 (depicted as entity properties 86(*a*), . . . 86(P)).

In some embodiments, memory 50 of workflow server 32 may also store a natural language workpiece instruction 88 from user 42 directing that one or more workpieces 94 to be used in conjunction with the workflow 62 be created. Workflow management application 55 may generate and send to LLM 60 (step 91) a workpiece prompt 90, the workpiece prompt 90 being based on the natural language workpiece instruction 88 and the entity properties 86. The workpiece prompt 90 requests that LLM 60 generate (step 91) a set of workpieces 94 (depicted as workpieces 94(*a*), . . . 94(Q)).

LLM 60 may be any kind of large language model, such as, for example GPT 3.5 Turbo or GPT 4.0 provided by OpenAI, Inc. of San Francisco, CA. In some embodiments, LLM 60 may be trained on a dataset including workflows 62 previously created for other tasks.

Memory 50 may also store various other data structures used by the OS, workflow management application 55, LLM 60, and/or various other applications and drivers. In some embodiments, memory 50 may also include a persistent storage portion. Persistent storage portion of memory 50 may be made up of one or more persistent storage devices, such as, for example, magnetic disks, flash drives, solid-state storage drives, or other types of storage drives. Persistent storage portion of memory 50 is configured to store programs and data even while the workflow server 32 is powered off. The OS, workflow management application 55, LLM 60, and/or various other applications and drivers are typically stored in this persistent storage portion of memory 50 so that they may be loaded into a system portion of memory 50 upon a system restart or as needed. The OS, workflow management application 55, LLM 60, and/or various other applications and drivers, when stored in non-transitory form either in the volatile or persistent portion of memory 50 (which may be referred to as a non-transitory computer-readable storage medium), each form a computer program product. The processing circuitry 36 running one or more applications thus forms a specialized circuit constructed and arranged to carry out the various processes described herein.

In some embodiments (not depicted), instead of the above-described functions of workflow server 32 being performed entirely by processing circuitry 36 of a single device 32 with corresponding data stored entirely within memory 40 of that device 32, the functions and data may be distributed across several computing devices communicatively coupled via network 34.

FIG. 2 illustrates an example method 100 performed by a system 30 for generating a workflow based on an instruction 51 from a user 42. It should be understood that any time a piece of software (e.g., OS, workflow management application 55, LLM 60, etc.) is described as performing a method, process, step, or function, what is meant is that a computing device 32, 33, 35 on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 110, workflow management application 55 receives instruction 51 from user 42 directing it to create workflow 62. In some embodiments, in sub-step 111, the instruction 51 is a natural language instruction 53. In other embodiments, in sub-step 112, the instruction 51 is a work procedure document 52 uploaded by user 42.

Then, in step 120, workflow management application 55 creates the workflow prompt 54 based on the instruction 51 and the workflow schema 54. This may include copying all or part of the workflow schema 54 into the workflow prompt 54 together with the instruction 51 or a modified version of the instruction 51. In some embodiments, in sub-step 123, the workflow prompt 54 just requests the broad steps 64 without requesting substeps 66. This may be done by omitting parts of the workflow schema 54 that define the substeps 66. In other embodiments, in sub-step 125, the workflow prompt 54 requests steps 64 as well as all substeps 66.

Once the workflow prompt 54 has been created, in step 130, workflow management application 55 queries the LLM 60 (either running locally on workflow server 32 or remotely on LLM server 33) with the workflow prompt 56. In response, in step 140, workflow management application 55 receives the workflow 62 generated by the LLM 60. In some embodiments, in sub-step 143, workflow 62 includes broad steps 64 without including substeps 66. In other embodiments, in sub-step 145, the workflow prompt 56 includes steps 64 as well as substeps 66. In some embodiments and use cases, operation may then proceed directly with step 190, in which the received workflow 62 is displayed to the user 42 in UI 46. In some cases, this may include allowing the user 42 to browse through the various steps 64 and substeps 66. In other cases, this may include displaying one step 64 at a time, beginning with the first step 64(1), including the various substeps 66 included therein. In some embodiments, UI 46 may display the substeps 66 as a checklist, allowing the user 42 to check off each substep 66 as it is performed. Once all substeps 66 have been checked off for a particular step 64(X), UI 46 proceeds to display the next step 64(X+1) until the workflow 62 has been completed. In other embodiments and use cases, instead of proceeding to step 190, optional steps 150-156, 160-164, and/or 170-186 may be performed after step 140.

In some embodiments, in step 150, workflow management application 55 displays the received steps 64 (and possibly also substeps 66) in UI 46. In some embodiments, the steps 64 are displayed as they are created. Thus, for example, step 64(1) may be displayed while subsequent steps 64(2)-64(M) are still being processed, and those steps 64(2)-64(M) may be added to the UI 46 later, as they are ready. In some embodiments, a step 64 may be displayed while its substeps 66 are still being processed, and those substeps 66 may be added to the UI 46 later, as they are ready. Once at least one step 64 has been displayed, steps 152-156 may be performed. In step 152, the user 42 inputs a natural language modification instruction 68 requesting that one or more of the displayed steps 64 or sub-steps 62 be changed. In response, in step 154, workflow management application 55 creates a modification prompt 70 based on the natural language modification instruction 68, the received workflow 62 (or at least the step 64 or sub-step 62 to be changed) and the workflow schema 54. Then, in step 156, workflow management application 55 queries the LLM 60 with the modification prompt 70, at which point operation returns back to step 140, allowing an updated workflow 62 to be generated and received in response.

In embodiments in which sub-steps 123, 143 were performed, steps 160-164 may be performed after step 140. In step 160, workflow management application 55 generates a substep prompt 72 for each of one or more of the received steps 64. The sub-step prompt 72 for a particular step 64 is generated with reference to that particular step 64 as well as the workflow schema 54. In step 162, workflow management application 55 queries the LLM 60 with the generated sub-step prompt(s) 72 for the one or more of the steps 64. In response, for each step 64 for which a corresponding substep prompt 72 was used to query the LLM 60, in step 164, a respective set of substeps 66 is received. Then, in some embodiments, operation may proceed directly to step 190, as described above.

In some embodiments, after step 164 (or directly after step 140, if steps 160-164 are omitted), steps 170-174 may be performed. In step 170, workflow management application 55 generates an entity property prompt 82 based on the workflow 62 and the entity properties schema 80. The entity properties prompt 82 requests a set of entity properties 86 for entities that are to be used to accomplish performance of the steps 64 and substeps 66. In step 172, workflow management application 55 queries the LLM 60 with the entity properties prompt 82 in order to generate the entity properties 86. In response, in step 174, the set of entity properties 86 is received. Then, in step 180, workflow management application 55 receives a natural language workpiece instruction 88 from the user 42 requesting creation of a set of workpieces 94. At some point prior to step 180 (whether prior to step 170 or after), workflow management application 55 may display the received steps 64 (and possibly also substeps 66) in UI 46 so that the user 42 is able to make an intelligent choice about what workpieces 94 to request in instruction 88. In response, in step 182, workflow management application 55 creates a workpiece prompt 90 requesting creation of the set of workpieces 94, as requested by the user 42 in the natural language workpiece instruction 88. In step 184, workflow management application 55 queries the LLM 60 with the workpiece prompt 90. In response, in step 186, workpiece prompt 90 receives the requested set of workpieces 94 consistent with the set of entity properties 86 from the LLM 60 in a format consistent with the entity properties schema 80.

After step 186, or directly after step 140 if steps 160-186 are omitted, operation proceeds with step 190, as described above.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes at least one tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "background" or as "conventional," Applicants make no admission that such technique, method, apparatus, or other concept is actually prior art under 35 U.S.C. § 102 or 103, such determination being a legal determination that depends upon many factors, not all of which are known to Applicants at this time.

What is claimed is:

1. A method performed by a computing system of workflow generation, the method comprising:

receiving, from a user, a first instruction to create a workflow to perform a task;

generating one or more prompts based on the first instruction and a predefined workflow schema, including generating a first prompt requesting a set of steps of the workflow to perform the task;

querying a large language model (LLM) with the one or more prompts, including querying the LLM with the first prompt;

in response to querying the LLM, receiving a workflow in a format consistent with the predefined workflow schema from the LLM;

in response to the LLM responding to the first prompt, generating a second prompt requesting a set of entity properties for entities used to accomplish performance of the set of steps, wherein generating the second prompt includes reference to a predefined entity type schema;

querying the LLM with the second prompt;

receiving the set of entity properties in response to the second prompt;

receiving a second instruction from the user to create workpieces to be used in conjunction with the received workflow;

generating a third prompt based on the second instruction, the received workflow, and the received set of entity properties;

querying the LLM with the third prompt;

in response to querying the LLM with the third prompt, receiving a set of workpiece data structures in a format consistent with the predefined entity type schema from the LLM;

displaying a workpiece visualization of the received set of workpiece data structures to the user; and displaying a visualization of the received workflow to the user, including:

displaying a step directing the user to photograph one or more workpiece corresponding to one or more workpiece data structures of the set of workpiece data structures;

in response to receiving a picture of the one or more workpiece, comparing the one or more workpiece to the corresponding one or more workpiece data structures and determining that there is an error with the one or more workpiece; and in response to determining that there is the error, pausing displaying the visualization of the received workflow to the user.

2. The method of claim 1 wherein the first and second instructions are natural language instructions.

3. The method of claim 1 wherein the first instruction is a document containing a description of how to perform the task.

4. The method of claim 1 wherein:

generating the one or more prompts further includes:

in response to the LLM responding to the first prompt with the set of steps, for at least one step of the set of steps, generating a fourth prompt requesting a set of substeps to accomplish performance of that step; and querying the LLM with the one or more prompts further includes:

in response to generating the fourth prompt, querying the LLM with the fourth prompt.

5. The method of claim 4 wherein:

generating the one or more prompts further includes, in response to the LLM responding to the first prompt:

displaying a preliminary visualization of the set of steps to the user;

receiving a natural language instruction from the user to modify the set of steps;

generating a fifth prompt based on the natural language instruction and the set of steps;

querying the LLM with the fifth prompt; and in response to querying the LLM with the fifth prompt, receiving an updated set of steps; and generating the fourth prompt is performed in response to receiving the updated set of steps.

6. The method of claim 4 wherein displaying the visualization of the received workflow to the user includes:

for the at least one step of the set of steps, displaying a description of that step, including the substeps for that step, as a checklist; and in response to the user checking off each substep, marking the at least one step as completed and displaying a description of a next step of the set of steps.

7. A computer program product comprising a non-transitory computer-readable storage medium storing instructions, which, when performed by processing circuitry of a computing system, cause the computing system to:

receive, from a user, a first instruction to create a workflow to perform a task;

generate one or more prompts based on the first instruction and a predefined workflow schema, including generating a first prompt requesting a set of steps of the workflow to perform the task;

query a large language model (LLM) with the one or more prompts, including querying the LLM with the first prompt;

in response to querying the LLM, receive a workflow in a format consistent with the predefined workflow schema from the LLM;

in response to the LLM responding to the first prompt, generate a second prompt requesting a set of entity properties for entities used to accomplish performance of the set of steps, wherein generating the second prompt includes reference to a predefined entity type schema;

query the LLM with the second prompt;

receive the set of entity properties in response to the second prompt;

receive a second instruction from the user to create workpieces to be used in conjunction with the received workflow;

generate a third prompt based on the second instruction, the received workflow, and the received set of entity properties;

query the LLM with the third prompt;

in response to querying the LLM with the third prompt, receive a set of workpiece data structures in a format consistent with the predefined entity type schema from the LLM;

display a workpiece visualization of the received set of workpiece data structures to the user; and display a visualization of the received workflow to the user, including:

displaying a step directing the user to photograph one or more workpiece corresponding to one or more workpiece data structures of the set of workpiece data structures;

in response to receiving a picture of the one or more workpiece, comparing the one or more workpiece to the corresponding one or more workpiece data structures and determining that there is an error with the one or more workpiece; and in response to determining that there is the error, pausing displaying the visualization of the received workflow to the user.

8. The computer program product of claim 7 wherein the first and second instructions are natural language instructions.

9. The computer program product of claim 7 wherein the first instruction is a document containing a description of how to perform the task.

10. The computer program product of claim 7 wherein:

generating the one or more prompts further includes:

in response to the LLM responding to the first prompt with the set of steps, for at least one step of the set of steps, generating a fourth prompt requesting a set of substeps to accomplish performance of that step; and querying the LLM with the one or more prompts further includes:

in response to generating the fourth prompt, querying the LLM with the fourth prompt.

11. The computer program product of claim 10 wherein:

generating the one or more prompts further includes, in response to the LLM responding to the first prompt:

displaying a preliminary visualization of the set of steps to the user;

receiving a natural language instruction from the user to modify the set of steps;

generating a fifth prompt based on the natural language instruction and the set of steps;

querying the LLM with the fifth prompt; and in response to querying the LLM with the fifth prompt, receiving an updated set of steps; and generating the fourth prompt is performed in response to receiving the updated set of steps.

12. The computer program product of claim 10 wherein displaying the visualization of the received workflow to the user includes:

for the at least one step of the set of steps, displaying a description of that step, including the substeps for that step, as a checklist; and in response to the user checking off each substep, marking the at least one step as completed and displaying a description of a next step of the set of steps.

13. A system comprising:

user interface circuitry configured to:

receive, from a user, a first instruction to create a workflow to perform a task; and receive a second instruction from the user to create workpieces to be used in conjunction with the workflow; and processing circuitry coupled to memory configured to:

generate one or more prompts based on the first instruction and a predefined workflow schema, including generating a first prompt requesting a set of steps of the workflow to perform the task;

query a large language model (LLM) with the one or more prompts, including querying the LLM with the first prompt;

in response to querying the LLM, receive a workflow in a format consistent with the predefined workflow schema from the LLM;

in response to the LLM responding to the first prompt, generate a second prompt requesting a set of entity properties for entities used to accomplish performance of the set of steps, wherein generating the second prompt includes reference to a predefined entity type schema;

query the LLM with the second prompt;

receive the set of entity properties in response to the second prompt;

generate a third prompt based on the second instruction, the received workflow, and the received set of entity properties;

query the LLM with the third prompt; and in response to querying the LLM with the third prompt, receive a set of workpiece data structures in a format consistent with the predefined entity type schema from the LLM;

wherein the user interface circuitry is further configured to display a workpiece visualization of the received set of workpiece data structures to the user and display a visualization of the received workflow to the user, including:

displaying a step directing the user to photograph one or more workpiece corresponding to one or more workpiece data structures of the set of workpiece data structures;

in response to receiving a picture of the one or more workpiece, comparing the one or more workpiece to the corresponding one or more workpiece data structures and determining that there is an error with the one or more workpiece; and in response to determining that there is the error, pausing displaying the visualization of the received workflow to the user.

14. The system of claim 13 wherein:

generating the one or more prompts further includes:

in response to the LLM responding to the first prompt with the set of steps, for at least one step of the set of steps, generating a fourth prompt requesting a set of substeps to accomplish performance of that step; and querying the LLM with the one or more prompts further includes:

in response to generating the fourth prompt, querying the LLM with the fourth prompt.

15. The system of claim 14 wherein:

generating the one or more prompts further includes, in response to the LLM responding to the first prompt:

displaying a preliminary visualization of the set of steps to the user;

receiving a natural language instruction from the user to modify the set of steps;

generating a fifth prompt based on the natural language instruction and the set of steps;

querying the LLM with the fifth prompt; and in response to querying the LLM with the fifth prompt, receiving an updated set of steps; and generating the fourth prompt is performed in response to receiving the updated set of steps.

* * * * *